(12) United States Patent
Shamsi et al.

(10) Patent No.: US 10,872,080 B2
(45) Date of Patent: Dec. 22, 2020

(54) REDUCING QUERY AMBIGUITY USING GRAPH MATCHING

(71) Applicant: Oath Inc., Dulles, VA (US)

(72) Inventors: Davood Shamsi, New York, NY (US); Wan Kim Mok, Brooklyn, NY (US); William Edward Pence, Bedford, NY (US)

(73) Assignee: Oath Inc., New York, NY (US)

( * ) Notice: Subject to any disclaimer, the term of this patent is extended or adjusted under 35 U.S.C. 154(b) by 220 days.

(21) Appl. No.: 15/961,158

(22) Filed: Apr. 24, 2018

(65) Prior Publication Data

US 2018/0307724 A1 Oct. 25, 2018

Related U.S. Application Data

(60) Provisional application No. 62/489,228, filed on Apr. 24, 2017.

(51) Int. Cl.
| | |
|---|---|
| *G06F 16/242* | (2019.01) |
| *G06F 16/951* | (2019.01) |
| *G06F 16/901* | (2019.01) |
| *G06F 16/2452* | (2019.01) |
| *G06F 40/30* | (2020.01) |

(52) U.S. Cl.
CPC ........ *G06F 16/2428* (2019.01); *G06F 16/243* (2019.01); *G06F 16/24522* (2019.01); *G06F 16/9024* (2019.01); *G06F 16/951* (2019.01); *G06F 40/30* (2020.01)

(58) Field of Classification Search
CPC .. G06F 16/2428; G06F 16/243; G06F 16/951; G06F 16/9024; G06F 16/24522; G06F 40/30

USPC .......................................... 707/766; 708/766
See application file for complete search history.

(56) References Cited

U.S. PATENT DOCUMENTS

| | | | | |
|---|---|---|---|---|
| 5,963,940 | A * | 10/1999 | Liddy | ................ G06F 16/3329 |
| 6,901,399 | B1 * | 5/2005 | Corston | ............. G06F 16/3344 |
| 8,332,394 | B2 * | 12/2012 | Fan | .......................... G06N 5/02 |
| | | | | 707/723 |

(Continued)

OTHER PUBLICATIONS

Zheng, Weiguo, et al., "How to Build Templates for RDF Question/Answering—An Uncertain Graph Similarity Join Approach", SIGMOD '15, Melbourne, Victoria, Australia, May 31-Jun. 4, 2015, pp. 1809-1824.*

(Continued)

*Primary Examiner* — Robert Stevens
(74) *Attorney, Agent, or Firm* — Cooper Legal Group, LLC

(57) ABSTRACT

Embodiments of the present invention provide systems, methods, and computer storage media directed at interpreting a query related to a dataset to reduce ambiguity of the query. In embodiments, a method includes determining potential meanings of words of a natural language query related to a particular dataset. A matching graph can be generated for the words of the query and the potential meanings for the words including similarity scores for the potential meanings. The method further includes reducing ambiguity of the matching graph by assigning selected potential meanings to the words. Upon reducing ambiguity of the matching graph, the matching graph can be used to provide a response to the query. Other embodiments may be described and/or claimed herein.

20 Claims, 6 Drawing Sheets

(56) References Cited

U.S. PATENT DOCUMENTS

| | | | | |
|---|---|---|---|---|
| 8,452,794 | B2* | 5/2013 | Yang | G06F 16/532 |
| | | | | 707/767 |
| 9,201,927 | B1* | 12/2015 | Zhang | G06F 16/35 |
| 2005/0080613 | A1* | 4/2005 | Colledge | G06F 16/951 |
| | | | | 704/9 |
| 2011/0055699 | A1* | 3/2011 | Li | G06F 16/951 |
| | | | | 715/709 |
| 2013/0262090 | A1* | 10/2013 | Xiong | G06F 40/30 |
| | | | | 704/9 |
| 2014/0172899 | A1* | 6/2014 | Hakkani-Tur | G06N 7/005 |
| | | | | 707/759 |
| 2016/0259863 | A1* | 9/2016 | Allen | G06F 16/90332 |
| 2017/0329868 | A1* | 11/2017 | Lindsley | G06F 16/367 |
| 2017/0371925 | A1* | 12/2017 | Arya | G06F 16/9024 |
| 2018/0075135 | A1* | 3/2018 | Dole | G06F 16/3344 |

OTHER PUBLICATIONS

Krause, Sebastian, et al., "Sar-graphs: A language resource connecting linguistic knowledge with semantic relations from knowledge graphs", Web Semantics: Science, Services and Agents on the World Wide Web, vols. 37-38, Elsevier B. V., Mar. 2016, pp. 112-131.*

Wang, Baoxun, et al., "Deep Learning Approaches to Semantic Relevance Modeling for Chinese Question-Answer Pairs", ACM Transactions on Asian Language Information Processing, vol. 10, No. 4, Article 21, Dec. 2011, pp. 1-16.*

Quarteroni, S., et al., "Designing an Interactive Open-Domain Question Answering System", Natural Language Engineering, vol. 1, No. 1, Cambridge University Press © 2008, pp. 1-23.*

Guo, Jiafeng, et al., "Intent-Aware Query Similarity", CIKM '11, Glasgow, Scotland, Oct. 24-28, 2011, pp. 259-268.*

* cited by examiner

US 10,872,080 B2

REDUCING QUERY AMBIGUITY USING GRAPH MATCHING

TECHNICAL FIELD

The present disclosure relates generally to natural language understanding. More specifically, and without limitation, the present disclosure relates to systems and methods for interpreting a query related to a dataset by reducing ambiguity in the query.

BACKGROUND

Users often wish to submit a query to a computing system and receive an accurate response. Oftentimes queries are submitted as natural language. In computing, natural language refers to a human language such as English, Swedish, Hindi, or Korean, distinct from an artificially commanded or programming language used to communicate with a computer. Computers often have difficulty in interpreting natural language due to ambiguity of words within a sentence and/or the particularities of the intent of the text.

As such, natural language understanding is used to understand natural human language. However, conventional natural language understanding techniques still encounter difficulty in reducing ambiguity of meaning for words within text. As a result, conventional techniques to not enable accurate responses to natural language queries. Put another way, conventional natural language understanding techniques do not seek to clarify ambiguity in a query to provide an accurate response to a user.

SUMMARY

In accordance with various embodiments of the present disclosure, a computer-implemented method is provided for interpreting a query related to a dataset to reduce ambiguity of the query. The method includes determining potential meanings of words of a natural language query (e.g., a query from a user) related to a particular dataset. The method further includes generating a matching graph for the words of the query and the potential meanings for the words including similarity scores for the potential meanings. The method further includes reducing ambiguity of the matching graph by assigning potential meanings to the phrases and/or words of the query. Reduction of ambiguity can be performed using one or more of the following: assigning meanings associated with identified key words within the query, selecting a meaning for a word when the similarity score of the meaning is above a predetermined threshold, selecting a meaning for a word when the similarity score for the meaning is equivalent to another potential meaning for the word, analyzing the relationship between the order of words to select the meaning for a word, presenting a clarification question to a user based on failure to select a potential meaning over another potential meaning for a word. Upon reducing ambiguity of the phrases and/or words of the query, the matching graph can be used to provide a response to the query (e.g., provide the response to a user).

In accordance with other various embodiments of the present disclosure, one or more computer-readable media are provided for storing instructions for interpreting a query related to a dataset to reduce ambiguity of the query. The instructions, when executed by a computing device, cause the computing device to determining potential meanings of words of a natural language query (e.g., from a user) related to a particular dataset. The instructions further cause the computing device to generate a matching graph for the words of the query and the potential meanings for the words including similarity scores for the potential meanings. The instructions then cause the computing device to reduce ambiguity of the matching graph by assigning selected possible meanings to the words. Reduction of ambiguity can be performed using one or more of the following: assigning meanings associated with identified key words within the query, selecting a meaning for a word when the similarity score of the meaning is above a predetermined threshold, selecting a meaning for a word when the similarity score for the meaning is equivalent to another potential meaning for the word, analyzing the relationship between the order of words to select the meaning for a word, presenting a clarification question to a user based on failure to select a potential meaning over another potential meaning for a word. Upon reducing ambiguity of the matching graph, the matching graph can be used to provide a response to the query (e.g., provide the response to a user).

In accordance with various system embodiments of the present disclosure, a system is provided for interpreting a query related to a dataset to reduce ambiguity of the query. The system includes a query analysis engine configured to determine potential meanings of words of a natural language query (e.g., from a user) related to a particular dataset. The query analysis engine is further configured to generate a matching graph for the words of the query and the potential meanings for the words including similarity scores for the potential meanings. The system further includes an ambiguity reduction engine configured to reduce ambiguity of the matching graph by assigning selected possible meanings to the words. Ambiguity reduction engine can reduce ambiguity using one or more of the following: assigning meanings associated with identified key words within the query, selecting a meaning for a word when the similarity score of the meaning is above a predetermined threshold, selecting a meaning for a word when the similarity score for the meaning is equivalent to another potential meaning for the word, analyzing the relationship between the order of words to select the meaning for a word, determining a clarification question should be presented to a user based on failure to select a potential meaning over another potential meaning for a word. The system further includes a response engine configured to either present the clarification question to a user or provide a response to the query (e.g., provide the response to a user).

This summary is provided to introduce a selection of concepts in a simplified form that are further described below in the Detailed Description.

DETAILED DESCRIPTION

As mentioned previously, a computer may have difficulty in answering a natural language query. The present invention is directed at a natural language understanding (NLU) system that facilitates interpreting a natural language query related to a dataset by reducing ambiguity of the query. Reference will now be made in detail to illustrative embodiments of the invention, examples of which are illustrated in the accompanying drawings.

Figure 1:
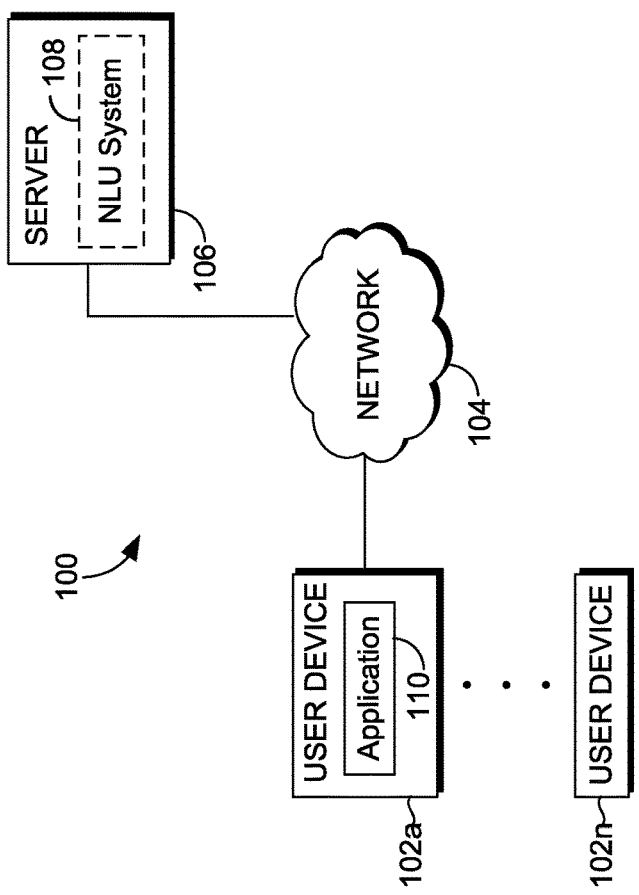
FIG. 1 depicts an example configuration of an operating environment in which some implementations of the present disclosure can be employed, in accordance with various embodiments of the present disclosure.

FIG. 1 depicts an example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 7.

It should be understood that operating environment 100 shown in FIG. 1 is an example of one suitable operating environment. Among other components not shown, operating environment 100 includes a number of user devices, such as user devices 102a through 102n, network 104, and server(s) 106. Each of the components shown in FIG. 1 may be implemented via any type of computing device, such as one or more of computing device 700 described in connection to FIG. 7, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 7. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 106 in carrying out interpreting a query related to a dataset by reducing ambiguity in the query. In some implementations, the application(s) comprises a web application, which can run in a web browser, and could be hosted at least partially on the server-side of environment 100. In addition, or instead, the application(s) can comprise a dedicated application, such as an application interpreting a query related to a dataset by reducing ambiguity in the query. In some cases, the application is integrated into the operating system (e.g., as a service and/or program). It is therefore contemplated herein that "application" be interpreted broadly. In embodiments, the application may be integrated with NLU system 108, for example, where the application is a chatbot integrated with NLU system 108.

In accordance with embodiments herein, application 110 facilitates a NLU system capable of interpreting a natural language query related to a dataset by reducing ambiguity of the query. In particular, a user can select or input a natural language query and, based on the dataset related to the query, the NLU system can reduce ambiguity in the query so that it is able to understand and interpret a natural language query and provide a response.

As described herein, server 106 can facilitate a user accessing NLU system 108. Server 106 includes one or more processors, and one or more computer-readable media. The computer-readable media includes computer-readable instructions executable by the one or more processors. The instructions may optionally implement one or more components of NLU system 108, described in additional detail below. It should be appreciated that while NLU system 108 is depicted as a single system, in embodiments, it can function as multiple systems capable of performing functionality of the system as described.

For cloud-based implementations, the instructions on server 106 may implement one or more components of NLU system 108. Application 110 may be utilized by a user to interface with the functionality implemented on server(s)

106, such as NLU system 108. In some cases, application 110 comprises a web browser. In other cases, server 106 may not be required, as further discussed with reference to FIG. 2.

Thus, it should be appreciated that NLU system 108 may be provided via multiple devices arranged in a distributed environment that collectively provide the functionality described herein. Additionally, other components not shown may also be included within the distributed environment. In addition, or instead, NLU system 108 can be integrated, at least partially, into a user device, such as user device 202a. Furthermore, NLU system 108 may at least partially be embodied as a cloud computing service.

Figure 2:
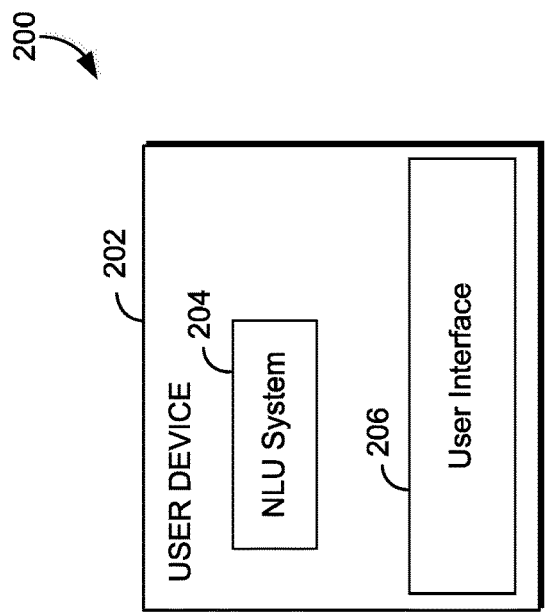
FIG. 2 depicts an example configuration of an operating environment in which some implementations of the present disclosure can be employed, in accordance with various embodiments of the present disclosure.

FIG. 2 depicts an example configuration of an operating environment in which some implementations of the present disclosure can be employed, in accordance with various embodiments of the present disclosure. The components of NLU system 204 may be implemented completely on a user device, such as user device 202. In other embodiments, NLU system 204 may be implemented using instructions on a server, such as previously described with reference to FIG. 1. In this way, instructions for NLU system 204 may reside on a server but be accessible via NLU system 204 by a user using, for example, user interface 206. It should be appreciated that while NLU system 204 is depicted as a single system, in implementations, the system can be multiple systems and/or have its functionality run using additional systems.

At a high level, NLU system 204 can analyze text, such as words and/or phrases, of an input natural language query and reduce ambiguity before executing the query to produce a response to a user. A user can access such an NLU system using, for example, user interface 206.

Figure 3:
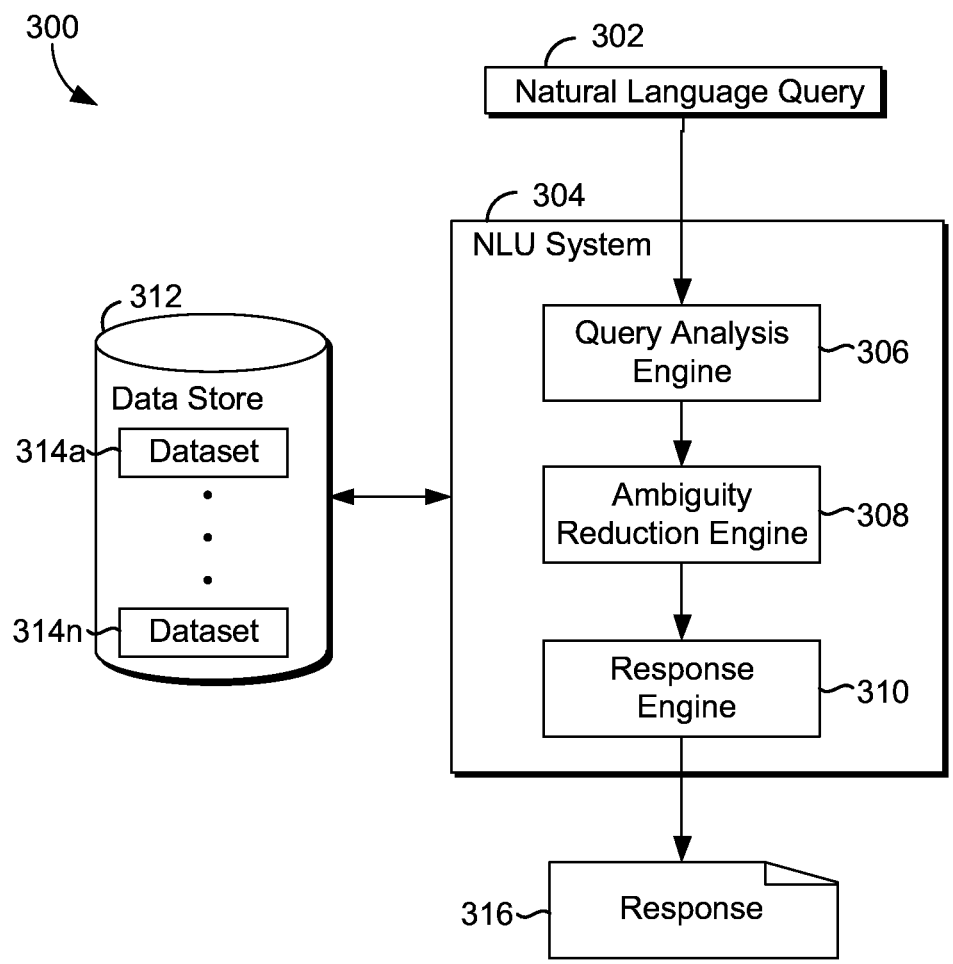
FIG. 3 depicts an illustrative natural language understanding (NLU) system for interpreting a query related to a dataset, in accordance with various embodiments of the present disclosure.

Turning now to FIG. 3, FIG. 3 provides an illustrative NLU system for interpreting a query related to a dataset by reducing ambiguity in the query, in accordance with various embodiments of the present disclosure. Such a NLU system can operate in operating systems as described with reference to FIGS. 1 and 2.

Data store 312 can store computer instructions (e.g., software program instructions, routines, or services), data, and/or models used in embodiments described herein. In some implementations, data store 312 stores information or data received via the various components of NLU system 304 and provides the various components with access to that information or data, as needed. Additionally, data store 312 may store information or data sent by NLU system 304. Although depicted as a single component, data store 312 may be embodied as one or more data stores. Further, the information in data store 312 may be distributed in any suitable manner across one or more data stores for storage (which may be hosted externally).

In embodiments, data stored in data store 312 includes datasets 314a-314n. Datasets can refer to any set of grouped data, such grouping can be very broad (e.g., all data on the internet) or specific (e.g., data related to a particular marketing campaign). A natural language query submitted to a NLU system can be in regard to a particular dataset, such as, for example, data related to a particular marketing campaign. Datasets can also be reference datasets, which can be used to interpret phrases and/or words of the query. A reference dataset, can contain, for example, metadata, event data, and specialized data. Metadata can refer to a set of data that describes and gives information about other data (e.g., describes relationships or definitions of words within the dataset). Event data can refer to various event types that can be based on words and/or phrases of the query that indicate an occurrence of a specific type of event or that specific information can be extracted from text (e.g., an event type could be a word indicating the occurrence of a condition, an action, or an event). Specialized data can refer to data specific to the context of the dataset and/or query (e.g., when the dataset relates to a particular marketing campaign, specific data can include marketing terms).

In some cases, data can be received by NLU system 304 from user devices (e.g., a query, question, or instruction from a user). In other cases, data can be received from one or more data stores in the cloud, for instance, a reference dataset can be received when required to respond to a query related to a particular dataset.

Natural language query 302 can be received and/or accessed by NLU system 304 (e.g., a natural language query can be received from a user device). NLU system 304 can include query analysis engine 306, ambiguity reduction engine, 308 and response engine 310. Query analysis engine 306 can match the words of the query to possible meanings using a reference dataset. The reference dataset used can be one or more of datasets 314a-314n stored in data store 312. In one query analysis implementation, the structure of the query can be analyzed to break the query into components, where components can be, for example, words and/or phrases. Each word and/or phrase can then be matched with potential meanings. For each potential meaning, a similarity score can indicate the likelihood a potential meaning is the intended meaning for the word and/or phrase. A similarity score can be determined based on the similarity of a phrase and/or word in the query and phrases and/or words in the reference dataset. Matching words and/or phrases of the query with data from the reference dataset can utilize metadata, event types, and/or specialized data. Once potential meanings are determined for the words and/or phrases of the query, a matching graph can be generated using the words from the query and the potential meanings. One implementation of a matching graph includes connecting matched words and potential meanings using weighted lines, or edges, based on the similarity score. Such a matching graph can include multiple potential meanings for the words and/or phrases of the query.

Upon determining potential meanings for the words and/or phrases of the query and generating a matching graph, ambiguity reduction engine 308 can be used to reduce ambiguity in the query. Ambiguity can be reduced by assigning a single meaning from multiple potential meanings to each phrase and/or word of the query. Reduction of ambiguity can be performed using one or more of the following: assigning meanings associated with identified key words within the query, selecting a meaning for a word when the similarity score of the meaning is above a predetermined threshold, selecting a meaning for a word when the similarity score for the meaning is equivalent to another potential meaning for the word, analyzing the relationship between the order of words to select the meaning for a word, presenting a clarification question to a user based on failure to select a potential meaning over another potential meaning for a word. Ambiguity reduction will be further discussed with reference to FIG. 4, below.

When a word and/or phrase is still matched with multiple potential meanings upon completion of the ambiguity reduction engine attempting to reduce ambiguity, and clarification is still needed, response engine 310 can be used to generate a clarification question to send to a user that submitted the query to help select a meaning that will reduce ambiguity in the query. A user can be presented with a clarification question to help select a meaning that will reduce ambiguity in the query. Such a clarification question can be presented in several ways. A multiple-choice list can be presented to the user from which the user can clarify what the user was asking and/or the user can be asked to restate the question in a more clear way to reduce ambiguity. This can happen if ambiguity is deemed to be unresolved by ambiguity reduction engine 308. Such a clarification question can be presented using, for example, response 316. Upon resolving the ambiguity using the clarification question, the matching graph can be used to provide a response to the query.

In addition, or in the alternative, response engine 310 can use the matching graph with reduced ambiguity for all words and/or phrases to generate response 316 that can be presented to a user. Such a response can be a presentation of information and or data to answer the query from the user.

Figure 4:
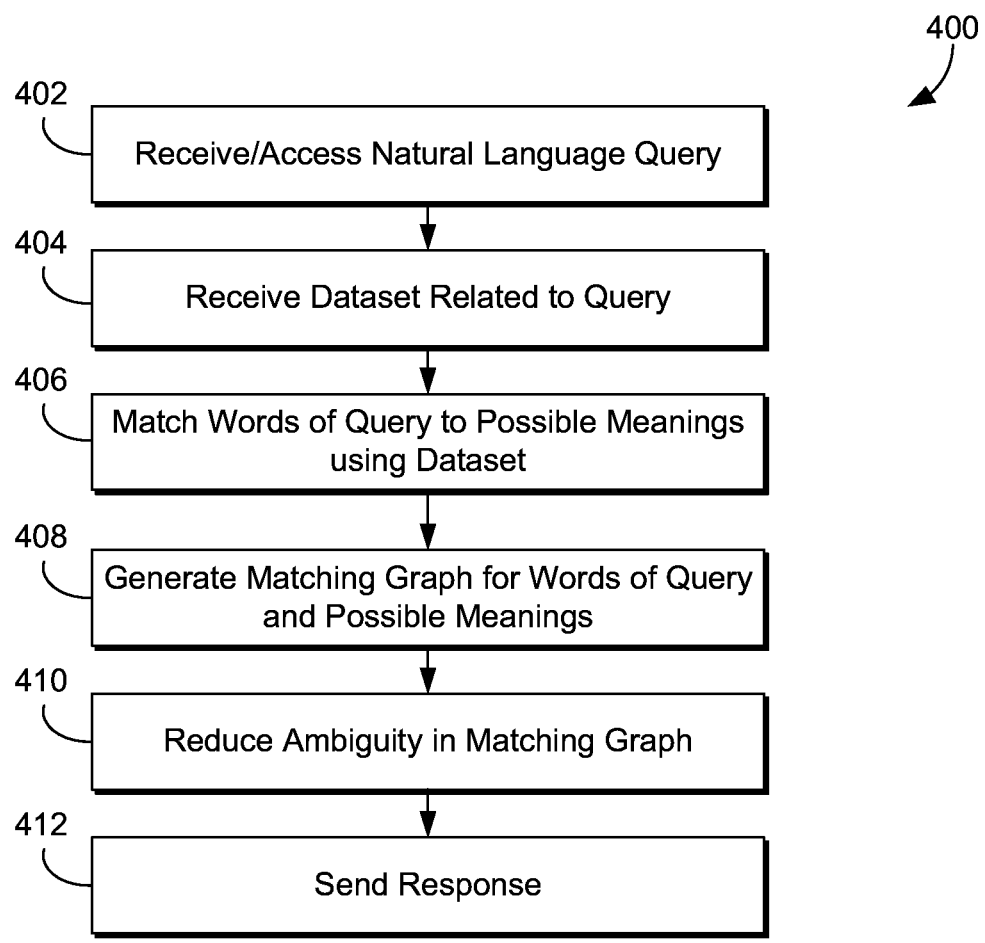
FIG. 4 depicts an illustrative process flow for interpreting a natural language query related to a dataset, in accordance with various embodiments of the present disclosure.

FIG. 4 depicts an illustrative process flow 400 for interpreting a natural language query related to a dataset by reducing ambiguity of the query, in accordance with various embodiments of the present disclosure. Process flow 400 may begin at block 402 where a natural language query can be received and/or accessed by a NLU system (e.g., NLU system 108 of FIG. 1, NLU system 204 of FIG. 2, and/or NLU system 304 FIG. 3). An example of such a query is: "pull impressions, and cpm for each campaign for android 5 and creative size 728×90" (Query 1). At block 404, a dataset related to the query can be received and/or access by the NLU system. For instance, continuing with example Query 1, the dataset can be a related marketing dataset. The dataset can contain metadata, event data, and specialized data. Metadata can refer to data that describes meanings that can be applied to phrases and/or words within the query. Event data can refer to various event types that can indicate an occurrence of a specific condition, action, or event. Specialized data can refer to data specific to the context of the query and/or dataset, for example, when the query or dataset relates to a particular marketing campaign, specific data can include marketing terms.

At block 406, the words of the query can be matched to potential meanings using the dataset. Part of this process can be to analyze the structure of the query to determine terms in the query that are key words. Key words can indicate the core, or main, words around which the sentence is structured. In the Query 1: pull impressions, and cpm for each campaign for android 5 and creative size 728×90, the key words can be "pull," "cpm," "for each," and "for." "Pull" indicates what action the user wants the system to perform. "Pull" can indicate that the user would like a report generated. "Cpm" is a marketing term for computing impression and cost, where impression is what an individual thinks about an advertisement and cost is how much the owner of an advertisement paid to post the ad. "For each" indicates how the user wants data divided, or grouped, during the analysis. "For" indicates what the user wants to apply the analysis to, or a limit of the analysis. Determining key words can be accomplished using traditional NLU algorithms for tagging words (e.g., API.AI or core NLU).

Additional analysis of the structure of the query can occur upon determining key words in a query to parse the remaining words and/or phrases contained in the query. This can be accomplished because the key words indicate the generic sentence structure and help designate start-points and end-points for the remaining words and/or phrases. Determining the structure of a query can allow the NLU system to determine if the query contains information necessary to answer the query, for instance, one version of the NLU system can require, for example, a designated time-period.

In one embodiment, once the structure of the query is analyzed, meanings can be determined for the parsed words and/or phrases. It should be appreciated that meanings can also be determined simultaneously with the analysis of the query structure. Words of the query can be matched with their meanings, where a meaning can be, for example, an action for the system to perform, definition of a word, a word indicating limitations of the query, how to group analyzed data, etc. Such meaning can be determined using the related dataset that can contain metadata, event data, and specialized data. Key words, can be matched to their meaning, as discussed above. The remaining words of the query can also be matched.

One form of matching can use a similarity score that indicates similarity between a phrase and/or word and a potential meaning. A similarity score can be determined using, for example, an algorithm. In one algorithm, string matching can be performed based on string comparison. String matching based on string comparison returns a score of 1.0, indicating a perfect match, when the query word matches a word in the dataset. A query word matching a word in the dataset can mean that the word in the dataset indicates a certain meaning should be ascribed to the query word, such as, an action for the system to perform, a definition of the word, limitations of the query, and/or how to group analyzed data, etc. In some cases, when a perfect match does not exist, string matching based on raw similarity can be performed. String matching based on raw similarity generally returns a similarity score over a threshold (e.g., a score above 0.9), otherwise, the algorithm will continue, for example, if a similarity score over a threshold does not exist. Both strings can be spell corrects and compared for phrase similarity to return the maximum score based on the similarity of phrases and/or words once spelling is corrected. It should be appreciated that matching words of the query to potential meanings using the dataset can result in multiple matches, where each match has a similarity score.

Matching words of the query based on the dataset can utilize metadata, event types, and/or specialized data. Information from the dataset can be used to assign meanings to words and/or phrases of the query. Assigning a meaning reducing ambiguity of the query by narrowing the possible meanings for the overall query based on the individual words and/or phrases.

One way for determining potential meanings for the words of the query is using the metadata related to the dataset. From Query 1, potential meanings from the metadata for "campaign" can be "campaign_id" and "campaign_name," each with a score of 0.7. Potential meanings of "android 5" can be "Android 5.0" and "Android 5.1," each with a score of 0.8. "Creative" matching can result in multiple potential meanings from the metadata: "creative" can mean "creative id," "creative size name," "creative size width," or "creative size height." With regard to "size," potential meanings include "creative size name," "creative size width," and "creative size height." "728×90" has a 0.5 likelihood of meaning "APP standard 728×90" and a 1.0 likelihood meaning "creative size name: 728×90."

Another way for determining potential meanings for the words of the query is using event data related to the dataset. Event data can be used to refer to various event types that can indicate an occurrence of an event meaning a specific information can be extracted from text, for example, the occurrence of a word is indicative of a specific event type (e.g., an event type could be a word indicating the occurrence of a condition, an action, or an event). For example, for Query 1, using event types from the dataset, when a word is "impression" then the event type=1. Event type=1 can be defined based on the dataset (e.g., impression can mean user thoughts). An event type indicates an occurrence that specific type of knowledge that can be extracted from text.

Understanding the context for determining the meaning of certain words in a query is important for reducing ambiguity in the query and can require specialized data. As such, the dataset can contain specialized data for use in understanding and selecting, or interpreting, meanings for words that can be categorized as "specialized" based on the query and related dataset. A word can be designated as "specialized" when its meaning is specific to a particular area (e.g. jargon). For instance, in the marketing context, it is understood that cpm is a marketing term and that it means determining impressions and costs. Allowing the system to understand the context of the query is within a certain specialty allows words to be analyzed in a context that will lessen ambiguity of the query (e.g., understanding that the query is related to marketing data can result in words being given meaning in that context).

When a query contains stop words, those words can be integrated into similarity scores. Stop words usually refer to common words in a language (e.g., the). When a phrase contains a stop word, a predetermined amount (e.g., small amount) can be added to the similarity score. One exemplary way for this to occur is to determine a total sum distance by adding a similarity score and the score for a stop word, determining a total word distance by adding scores for stop words, and then determining if total sum distance/max (0.01, total word distance) exceeds a predetermined threshold. When the stop word determination exceeds a predetermined threshold, the meaning is assigned for that word.

At block 408, the above discussed potential meanings can be used along with the words of the query to generate a matching graph (e.g. a confusion graph). In some embodiments, this may be accomplished by listing the words from the query on the left and listing the potential meanings for the words of the query on the right with matches indicated by a weighted line, or edge, based on the similarity score. The matching graph can include multiple potential meanings for the words in the query.

At block 410, ambiguity can be reduced for the query as generated at block 408. Ambiguity can be reduced by assigning meanings to words in one or more ways. First, meanings associated with identified key words within the query can be assigned. This resolves already matched words, for example, in Query 1, "pull," "cpm," "for each," and "for" were already matched words. As such, no further determination of their meaning is needed to resolve ambiguity. Next, a potential meaning for a word can be selected when the similarity score of the meaning is above a predetermined threshold (e.g., score 1.0 matching). When an edge of the graph is above a predetermined threshold, lower scored edges can be removed to reduce ambiguity in the query. Using Query 1 as an example, 728×90 was matched with creative size name=728×90 with a similarity score of 1.0 and to APP standard 728×90 with a similarity score of 0.5, because the first match has a score of 1.0, that potential meaning can be selected and the potential meaning with the 0.5 similarity score can be removed. A potential meaning can also be selected for a word when the similarity score for the meaning is equivalent to another potential meaning for the word. Again, using Query 1 as an example, "campaign" matched to "campaign_name" and "campaign_id." Using the related dataset can indicate that "campaign_name" and "campaign_id" are equivalent terms that have the same meaning. As such, the NLU system can select one or the other without changing the meaning of the word within the query. However, selecting one of the terms is advantageous because it reduces ambiguity in the query. Further selection of potential meanings for a word in the query includes analyzing the relationship between the order of words to select a potential meaning for a word. In Query 1, "creative" and "size" match with a multiple potential meanings, resulting in a high degree of ambiguity. Looking at the order of words of the query, specifically, the "creative" is followed by "size" which is followed by "728×90" indicates which potential meaning should be selected: "creative" can mean "creative id," "creative size name," "creative size width," or "creative size height;" "size," can mean "creative size name," "creative size width," and "creative size height;" "728×90" was preciously determined to mean "creative size name: 728×90." In this way, "creative size" can be determined to be a phrase with the meaning "creative size name."

When a word is still matched with multiple potential meanings, the user can be presented with a clarification question to help select a meaning that will reduce ambiguity in the query. Such a clarification question can be presented in several ways. If a word is matched with 10 or less potential meanings, a multiple-choice list can be presented to the user from which the user can clarify what the user was asking. If a word is matched with more than 10 potential meanings, the user can be asked to restate the question in a more clear way to reduce ambiguity. In Query 1, a meaning for "Android 5" may not be determined using the related dataset. While the two potential meanings, "Android 5.0" and "Android 5.1" have identical similarity scores of 0.8, "Android 5.0" and "Android 5.1" are not equivalent terms and nothing in the query indicates one should be picked over the other. As such, the user who submitted the query can be presented a clarification question of whether they mean "Android 5.0" or "Android 5.1."

At block 412, upon reducing ambiguity of the matching graph by assigning one meaning to each word and/or phase in the query, the matching graph with reduced ambiguity can be then be used to provide a response to the query (e.g., provide a response to a user's query).

Figure 5:
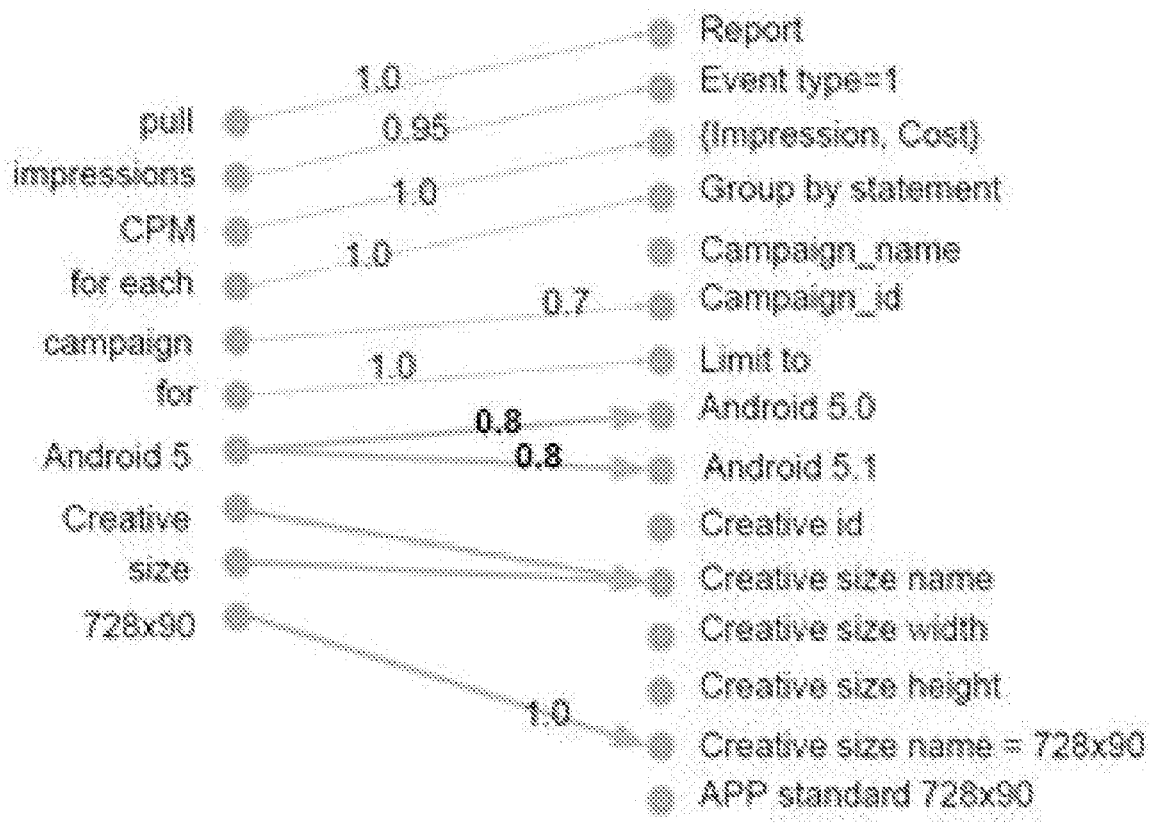
FIG. 5 depicts an illustrative query graph for interpreting a query related to a dataset, in accordance with various embodiments of the present disclosure.

FIG. 5 depicts an illustrative query graph for interpreting a query related to a dataset, in accordance with various embodiments of the present disclosure. The query can be, for example, Query 1: "pull impressions, and cpm for each campaign for android 5 and creative size 728×90." FIG. 4 describes the manner in which such a query graph is generated. The left side of the query graph can be, for instance, the words/phrases of the query. The right side of the query graph can be, for instance, the meanings matched to from the reference dataset. The illustrated arrows can indicate, for example, the matching between the words/phrases of the query and the meaning from the reference dataset. As illustrated, it can be seen that certain meanings have been selected, indicate, for example, by an arrow, over other potential meanings, no longer connected by an arrow. In addition, it can be seen that ambiguity still exists, based on the meaning of "Android 5." When such ambiguity exists, a user can be presented with a clarification question as to the intended meaning of a word and/or phase.

Figure 6:
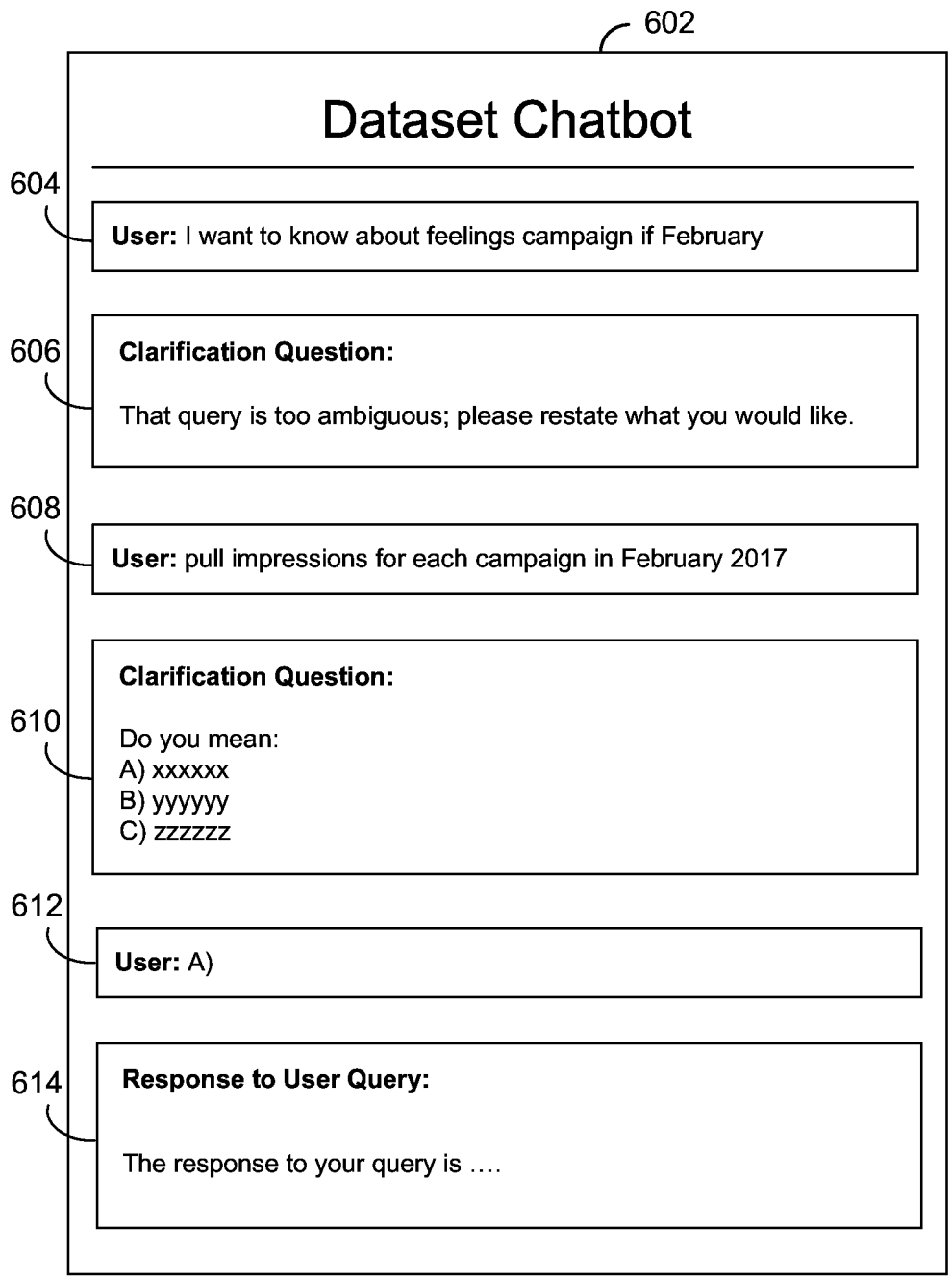
FIG. 6 depicts an illustrative graphical user interface (GUI) of a dataset chatbot interfacing with a NLU system, in accordance with various embodiments of the present disclosure.

FIG. 6 depicts an illustrative graphical user interface (GUI) of a dataset chatbot interfacing with a NLU system, in accordance with various embodiments of the present disclosure. As illustrated, dataset chatbot 602 is shown with a conversational like communications between a user and the dataset chatbot. User input 604 illustrates a user-inputted query to the dataset chatbot: "I want to know about feelings campaign if February." In this example, the dataset chatbot has returned clarification question 606, "That query is too ambiguous; please restate what you would like." It should be appreciated that in embodiments of a NLU system, such a question might not be found to be too ambiguous and the response is shown for illustrative purposes of different types of interactions between the dataset chatbot and a user. Additionally, or in the alternative, the chatbot could also return a response that additional information is needed (e.g., a most specific date range). User input 608 illustrates a restated query into chatbot 602: "pull impressions for each campaign in February 2017." A NLU system, as previously described, can understand and interpret the natural language query related to a dataset by using the process of reducing ambiguity of the query (e.g., the process described with reference to FIG. 4). Clarification question 610 can be presented to the user if there is ambiguity in a meaning of a word of user input 608. User input 612 indicates the intended meaning of the word. Using this meaning, the NLU system can present response to user query 614 to the user.

Figure 7:
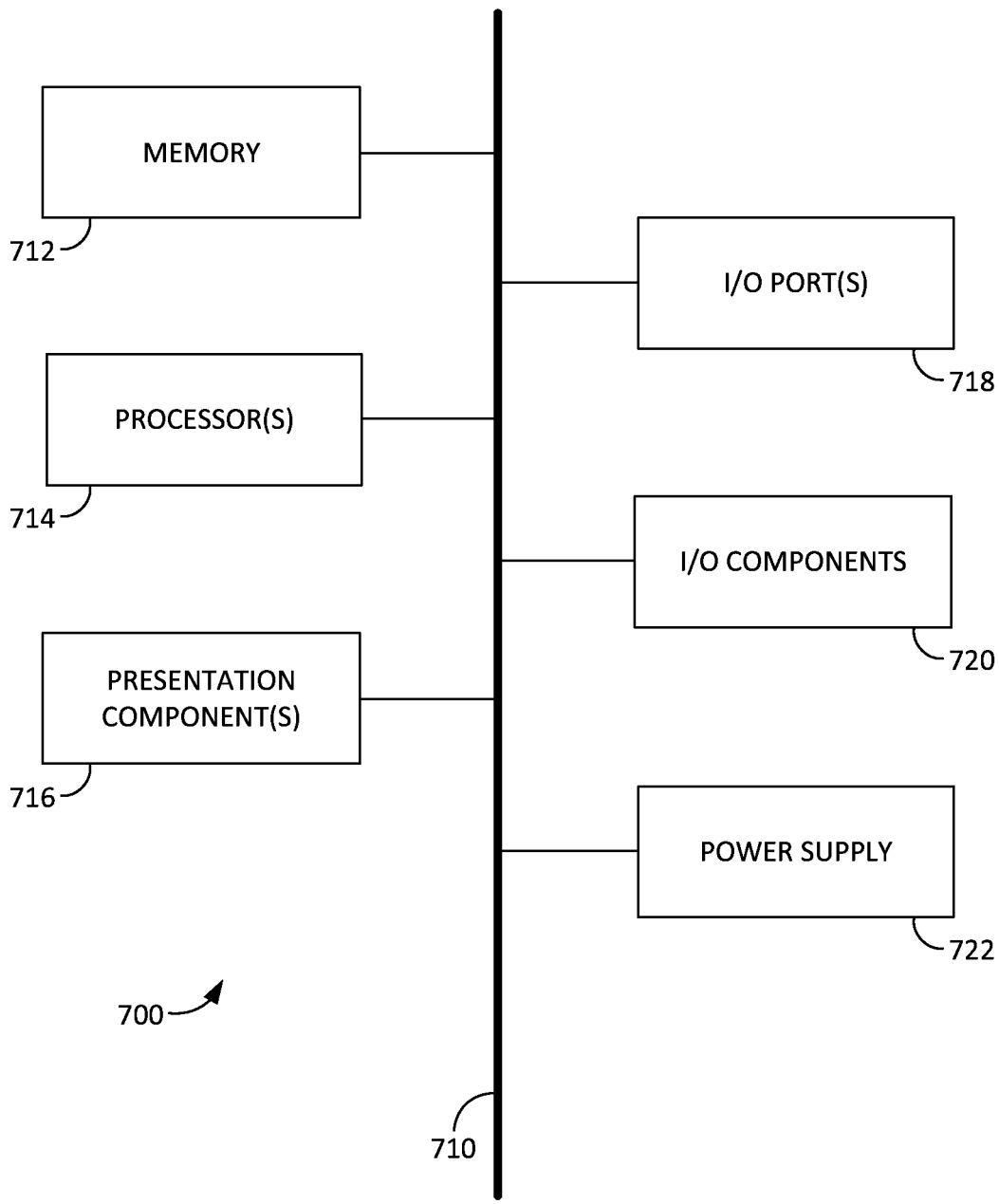
FIG. 7 is a block diagram of an example computing device in which various embodiments of the present disclosure may be employed.

Having described embodiments of the present invention, an example operating environment in which embodiments of the present invention may be implemented is described below in order to provide a general context for various aspects of the present invention. Referring to FIG. 7, an illustrative operating environment, or computing platform, for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialized computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output (I/O) ports 718, I/O components 720, and an illustrative power supply 722. Bus 710 represents what may be one or more busses (such as an address bus, data bus, or combination thereof). Although depicted in FIG. 7, for the sake of clarity, as delineated boxes that depict groups of devices without overlap between these groups of devices, in reality this delineation is not so clear cut and a device may well fall within multiple ones of these depicted boxes. For example, one may consider a display to be one of the one or more presentation components 716 while also being one of the I/O components 720. As another example, processors have memory integrated therewith in the form of cache; however, there is no overlap between the one or more processors 714 and the memory 712. A person having ordinary skill in the art will readily recognize that such is the nature of the art, and it is reiterated that the diagram of FIG. 7 merely depicts an illustrative computing device that can be used in connection with one or more embodiments of the present invention. It should also be noticed that distinction is not made between such categories as "workstation," "server," "laptop," "hand-held device," etc., as all such devices are contemplated to be within the scope of computing device 700 of FIG. 7 and any other reference to "computing device," unless the context clearly indicates otherwise.

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Typical hardware devices may include, for example, solid-state memory, hard drives, optical-disc drives, etc. Computing device 700 includes one or more processors 714 that read data from various entities such as memory 712 or I/O components 720. Presentation component(s) 716 present data indications to a user or other device. Illustrative presentation components include a display device, speaker, printing component, vibrating component, etc.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method for understanding queries, comprising:
    determining potential meanings of portions of a query using a dataset, wherein the dataset includes metadata, event data, and specialized data;
    generating a query graph, wherein the query graph comprises similarity scores for the potential meanings matched with the portions of the query, wherein the query graph comprises:
        a first similarity score of a first meaning of a first portion of the query, wherein the first similarity score is based upon a first similarity of the first portion of the query to one or more portions of the dataset;
        a second similarity score of a second meaning of the first portion of the query, wherein the second similarity score is based upon the first similarity of the first portion of the query to one or more portions of the dataset;
        a third similarity score of a third meaning of a second portion of the query, wherein the third similarity score is based upon a second similarity of the second portion of the query to one or more portions of the dataset; and
        a fourth similarity score of a fourth meaning of the second portion of the query, wherein the fourth similarity score is based upon the second similarity of the second portion of the query to one or more portions of the dataset;
    reducing ambiguity of the query by assigning a single meaning to each of the portions of the query based upon the similarity scores, wherein the assigning comprises assigning the first meaning to the first portion of the query based upon the first similarity score of the first meaning and assigning the third meaning to the second portion of the query based upon the third similarity score of the third meaning; and
    upon reducing ambiguity of the query, generating an answer to the query using the first meaning of the first portion of the query and the third meaning of the second portion of the query.

2. The computer-implemented method of claim 1, wherein the similarity scores are generating using string matching based upon string comparison.

3. The computer-implemented method of claim 1, wherein reducing ambiguity further comprises:
    designating at least one of the portions of the query as a key word by assigning a potential meaning associated with the key word, wherein the key word indicates a main element being asked in the query.

4. The computer-implemented method of claim 1, wherein reducing ambiguity further comprises:
    selecting a potential meaning for a word when the potential meaning scores above a predetermined threshold.

5. The computer-implemented method of claim 1, wherein reducing ambiguity further comprises:
    selecting a first potential meaning for a word when the first potential meaning for the word is equivalent to a second potential meaning for the word.

6. The computer-implemented method of claim 1, wherein reducing ambiguity further comprises:
    analyzing an order of words to select a potential meaning for a word, the order of words indicating a relationship between the order of words with the potential meaning for the word.

7. The computer-implemented method of claim 1, wherein reducing ambiguity further comprises:
    presenting a clarification question to a user based upon failure to select one of the potential meanings for a word.

8. The computer-implemented method of claim 7, wherein the clarification question is presented using one or more of a selectable multiple-choice list and asking to restate the query.

9. A non-transitory machine-readable storage medium including instructions which, when executed by a machine, cause the machine to:
    determine potential meanings of words of a query using a dataset, wherein the dataset includes metadata, event data, and specialized data;
    generate a query graph, wherein the query graph includes similarity scores for the potential meanings matched with the words of the query, wherein the query graph comprises:
        a first similarity score of a first meaning of a first word of the query, wherein the first similarity score is based upon a first similarity of the first word of the query to one or more portions of the dataset;
        a second similarity score of a second meaning of the first word of the query, wherein the second similarity score is based upon the first similarity of the first word of the query to one or more portions of the dataset;
        a third similarity score of a third meaning of a second word of the query, wherein the third similarity score is based upon a second similarity of the second word of the query to one or more portions of the dataset; and
        a fourth similarity score of a fourth meaning of the second word of the query, wherein the fourth similarity score is based upon the second similarity of the second word of the query to one or more portions of the dataset;

reduce ambiguity of the query by assigning a single meaning to at least one of the words of the query; and upon reducing ambiguity of the query, generate an answer to the query using the query graph.

10. The non-transitory machine-readable storage medium of claim 9, wherein the instructions further cause the machine to:

designate at least one of the words of the query as a key word; and assign a potential meaning associated with the key word, wherein the key word indicates a main element being asked in the query.

11. The non-transitory machine-readable storage medium of claim 9, wherein the instructions further cause the machine to:

select a potential meaning for a word when the potential meaning scores above a predetermined threshold.

12. The non-transitory machine-readable storage medium of claim 9, wherein the instructions further cause the machine to:

select a first potential meaning for a word when the first potential meaning for the word is equivalent to a second potential meaning for the word.

13. The non-transitory machine-readable storage medium of claim 9, wherein the instructions further cause the machine to:

analyze an order of words to select a potential meaning for a word, the order of words indicating a relationship between the order of words with the potential meaning for the word.

14. The non-transitory machine-readable storage medium of claim 9, wherein the instructions further cause the machine to:

present a clarification question to a user based upon failure to select one of the potential meanings for a word.

15. A computer system comprising:

one or more processors; and one or more computer storage media storing instructions that, when used by the one or more processors, cause the one or more processors to run an advertising system of one or more components configured to:

determine potential meanings of words of a query using a dataset, wherein the dataset includes metadata, event data, and specialized data;

generate a query graph, wherein the query graph includes similarity scores for the potential meanings matched with the words of the query;

reduce ambiguity of the query by assigning a single meaning to each of the words of the query based upon the similarity scores, wherein the assigning comprises assigning a first single meaning to a first word of the query based upon a first similarity score of the first single meaning and assigning a second single meaning to a second word of the query based upon a second similarity score of the second single meaning; and upon reducing ambiguity of the query, generate an answer to the query using the first single meaning of the first word of the query and the second single meaning of the second word of the query.

16. The computer system of claim 15, wherein the instructions further cause the one or more processors to:

designate at least one of the words of the query as a key word; and assign a potential meaning associated with the key word, wherein the key word indicates a main element being asked in the query.

17. The computer system of claim 15, wherein the instructions further cause the one or more processors to:

select a potential meaning for a word when the potential meaning scores above a predetermined threshold.

18. The computer system of claim 15, wherein the instructions further cause the one or more processors to:

select a first potential meaning for a word when the first potential meaning for the word is equivalent to a second potential meaning for the word.

19. The computer system of claim 15, wherein the instructions further cause the one or more processors to:

analyze an order of words to select a potential meaning for a word, the order of words indicating a relationship between the order of words with the potential meaning for the word.

20. The computer system of claim 15, wherein the instructions further cause the one or more processors to:

present a clarification question to a user based upon failure to select one of a first potential meaning for a word and a second potential meaning for the word.

* * * * *